June 10, 1958
H. W. STARKWEATHER, JR
2,838,418
ADHESION OF RESINS TO GLASS
Filed July 22, 1954
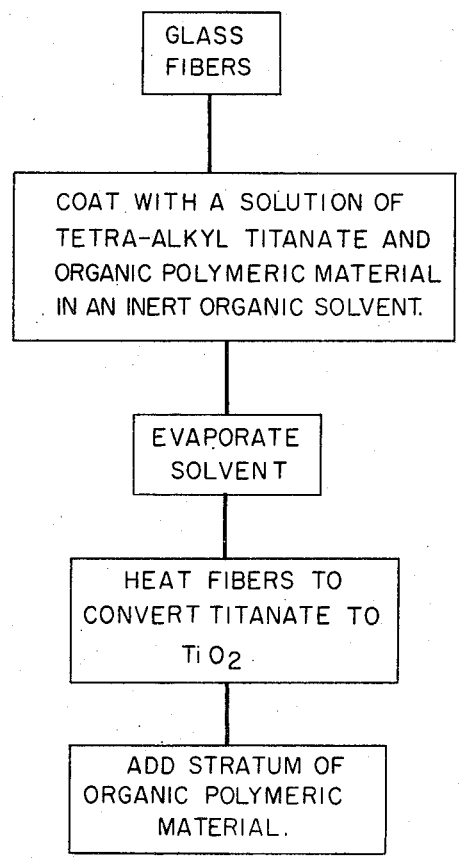
INVENTOR
HOWARD WARNER STARKWEATHER
BY  *G. McAlevy*
ATTORNEY

United States Patent Office 2,838,418
Patented June 10, 1958

2,838,418
ADHESION OF RESINS TO GLASS

Howard Warner Starkweather, Jr., Wilmington, Del., assignor to E. I. du Pont de Nemours and Company, Wilmington, Del., a corporation of Delaware Application July 22, 1954, Serial No. 445,205

10 Claims. (Cl. 117—65)

This invention relates to a process for applying to the surfaces of glass fibers and the like a coating which provides a surface for improved adhesion to resinous materials.

In the Haslam Patent, U. S. 2,768,909, it is disclosed that clear, transparent, flexible adherent supported films can be prepared by hydrolysis of an alkyl titanate in the form of a coating on the supporting base. In the said process, the hydrolysis of alkyl titanate is performed by means of water vapor.

An object of the present invention is to provide further improvements for bonding a resin to glass, through the use of an intervening layer which improves the strength of the bond. Other objects of the invention will appear hereinafter.

It has been discovered, according to this invention, that when a solution of an organic polymeric material, in an inert organic solvent containing a tetra-alkyl titanate, is applied as a coating to glass fibers, and solvent is evaporated therefrom, the resulting coating can be converted by hydrolysis with moist air or by heating in an oven preferably at temperatures of 75° to 200° C., to a surface which can be made to adhere to a film of the same or different organic polymeric material. Thus, the article produced by the process of this invention as shown in the accompanying drawing, comprises three strata, viz., firstly the glass itself, secondly, the stratum of titanium compound (largely oxide) in admixture with polymer, and thirdly the stratum of polymer as the sole essential component.

The polymers which can be employed effectively in the practice of this invention, both in the interlayer coat, and in the polymer stratum are soluble polymers such as polyethylene, polystyrene, polymethyl methacrylate, isobutylene interpolymers such as isobutylene/maleimide, polymeric polyesters, polymeric polyimides, polymeric polyamides, and in general all of the addition and condensation polymers and interpolymers which can be dissolved in inert organic media. Thermosetting resins such as urea-formaldehyde, phenol-formaldehyde, melamineformaldehyde, etc. can be used provided they have not been converted to the infusible-insoluble stage. The polymers can of course be converted to insoluble forms after the bonded object is produced.

It is to be understood that in a plastic structure reinforced with glass fibers, the fibers bear most of the stress and the plastic serves to transmit the stresses between the fibers. In general a thermoplastic can do this as well as a thermosetting resin. However, to achieve this result in the most effective manner it is essential that there be a strong bond between the plastic and the glass, as well as intimate contact throughout the structure. Thus it is important that the polymer be one which is capable of melting and wetting the surfaces of the reinforcing agent with which it comes into contact. To transmit the stresses, the polymer must have a finite, though not necessarily large, modulus.

The advantages of this invention are most pronounced in bonding to glass fibers polymers which have essentially no adhesion to glass, such as polyethylene or polystyrene. Some polymers which adhere well, are not as greatly aided in their adhering qualities by the interlayer herein disclosed; however, those polymers, which do not require a primer, generally have excessively large amounts of polar groups such as carboxyl, and are water-sensitive, hence are not preferred for many applications. Since the interlayer herein disclosed improves the water resistance of the adhesive bonds between these water sensitive resins and glass, the use of the interlayer is beneficial even when the impregnating resin is highly polar. Polymers having small amounts of strongly polar groups such as carboxyl or a larger number of moderately polar groups such as ester groups can be used effectively, by applying the process of this invention. Moreover, to improve adhesion of certain polymers, especially those which would otherwise be non-polar, it is frequently helpful to include in the polymer molecule a copolymerized ingredient, especially one which introduces a small amount of polar groups. Similarly small amounts of polar groups can be introduced by substitution reactions, e. g. chlorination. Suitable comonomers include methyl methacrylate, methacrylic acid, vinyl esters, acrylic acid, etc. Similarly end groups can be supplied in the known matter, to produce a less marked but similar effect.

The capacity of a polymer to wet, or spread spontaneously over, a solid surface, hereinabove mentioned, is dependent upon the surface tensions of the polymer melt and of the solid. A liquid will not wet a solid surface unless this process is accompanied by a decrease in free energy. It is a necessary but not sufficient condition for a liquid to spread on a solid that the surface tension of the liquid be lower than that of the solid. The surface tension of a polymer melt depends largely upon the presence of polar groups. It is to be recognized that some polymer melts are so viscous that they do not flow over the surface of the reinforcement, even though they do indeed wet the surface thereof.

In illustrating the improvement which is realized by the process or method of this invention, various methods of testing were applied to measure the strength of polymer-glass bonds.

One of these methods was by use of a device, called an adherometer, which employs a standardized ivory or metal knife to strip a film of plastic from a glass slide. The force required to be applied against the knife to strip the film includes the force required to deform the film, the tearing force, and the frictional force between the knife and the surface in contact therewith, particularly the glass. The latter can be measured readily by using the device on a clean glass plate, hence can be subtracted from the total. The plastic deformation and tearing factors can be minimized by the use of extremely thin films, e. g., a few hundredths of a mil up to a few tenths of a mil. Within this range the stripping force was found to be independent of thickness, in the case of thermoplastic resins, although not in the case of thermoset resins. Thus, the adherometer tests require special interpretation when applied to thermoset resins.

The tests reported in Table I were made on specimens prepared by the following method. The polymer was applied to the glass surface by dipping the glass test pieces (3 x 2 in. slides) into a solution of the polymer in which the polymer content was 1 to 2%. Temperatures hot enough to dissolve the polymer were used. In those tests in which a coating of polymer-titanium ester was applied, the base to be coated was dipped in a solution of polymer and a quantity of titanium ester equal to twice the weight of polymer (content of polymer plus ester in solution, 2%). After dipping the specimens were allowed to drain and were baked in moist air at a temperature sufficiently high to produce TiO$_2$ rapidly, e. g. about 120°. Where, in these tests, a specimen which was coated with polymer was compared with one which was coated with polymer-titanium compound and also with an outer layer of polymer, two coats of polymer were used with the specimens which contained no ester.

particles, in the interlayer, or resin layer, in the method of this invention. For example, it has been found that calcium carbonate filler, which is cheap and will not abrade the glass fibers, can be used to the extent of 40% of the weight of the polymer (particle size of the filler about 0.04 microns) without serious disadvantage and

TABLE I

Adherometer measurements on bonds between glass and polymer films, with an intervening layer of polymer-titanium compound mixture

| Polymer in external film | Polymer in interlayer coating | Titanium ester in initial coating | Solvent in initial coating | Dry | Stripping force, Dynes/ cm. × 10⁻⁸ | |
|---|---|---|---|---|---|---|
| | | | | | Immersed in H$_2$O 2 days | Immersed in H$_2$O 7 days |
| Polyethylene | None | None | None | Nil | | |
| Do | Polyethylene | TPT | Toluene | 0.3 | 0.6 | |
| Polystyrene | None | None | None | Nil | Nil | |
| Do | Polyethylene | TPT | Toluene | 0.6 | | |
| Do | Polystyrene | TPT | do | 2.3 | | 2.1 |
| Do | None | TPT | do | 2.1 | 2.1 | |
| Hexamethylene polyadipamide | do | None | None | 2.5 | 2.6 | 1.7 |
| Do | Hexamethylene polyadipamide | TPT | m-Cresol | 3.2 | 2.3 | |
| Do | Polystyrene | TPT | Toluene | 1.8 | 1.5 | |
| Do | None | TPT | do | 0.9 | 0.9 | |
| Polymethyl methacrylate | do | None | None | 3.6 | 3.2 | 3.3 |
| Do | Polymethyl methacrylate | TPT | m-Cresol | 3.7 | 3.3 | |
| Do | Polystyrene | TPT | Toluene | 3.8 | 3.3 | |
| Polyethylene Terephthalate | None | None | None | 0.7 | | |
| Do | Polyethylene Terephthalate | TPT | m-Cresol | 1.6 | 2.1 | |
| Do | Polystyrene | TPT | Toluene | 0.7 | <0.6 | |
| Do | Hexamethylene polyadipamide | TPT | m-Cresol | 1.8 | 1.8 | |
| Do | Polymethyl methacrylate | TPT | do | 2.0 | 1.0 | |
| Do | do | TPT | Toluene | 1.0 | 0.9 | |
| Do | None | TPT | Do | 0.4 | 0.4 | |
| Polyformaldehyde resin | do | None | None | 1.5 | | |
| Do | Polystyrene | TPT | Toluene | 2.7 | 1.2 | |
| Do | Polyformaldehyde resin | TPT | Dimethylformamide | 3.0 | 1.7 | |

TPT=tetraisopropyl titanate.

It is evident from the tests reported in Table I that not only does the presence of the interlayer greatly aid adhesion of the polymer to the glass surface, but also that the presence of polymer in the interlayer appreciably aids the said adhesion.

While the polymer present in the interlayer may in some instances differ from the polymer used for impregnation, this is not usually the case, as it is frequently better to use the same polymer for impregnation as was used in the interlayer coating, since in general molten polymers bond well with themselves.

Shear strength determinations were made on some of the specimens in order to orient the data obtained in the adherometer tests. In this connection the shear strength of glass-polyethylene bond was found to be 32.6±13.7 p. s. i.; the shear strength of the glass-hexamethylene polyadipamide was found to be 2550 p. s. i.; and the shear strength of polyethylene terephthalate-glass bond was found to be 2300.

The above-described methods for quantitatively testing and comparing adhesive bond properties have been supplemented by other tests aimed at comparing the properties of the laminates themselves, as distinguished from the adhesive bond per se. In this connection laminates were made from glass mat or glass cloth impregnated with the resin under test, and coated in the specified instances with the polymer-titanium compound blends, applied, as above described, to glass fibers. Table II records the results of these comparative tests.

*Example.*—Using the coating method described in connection with Table I, glass mats and glass cloth were treated with the compositions described in the foregoing table. The laminates thus obtained were subjected to physical tests, with results as set forth in the table.

It is permissible to employ fillers such as silica, titania, carbon, etc., which can be in the form of colloidal-sized with certain beneficial effects, namely, increased stiffness, improved surface properties and obscuration of the fiber pattern at the surface of the laminate. The most finely divided fillers are not generally the most preferred, since it is more difficult to disperse the most finely divided filler even when they are coated to reduce the tendency to agglomerate.

The temperatures employed in impregnating the coated fibers with resin should be high enough to cause the resin to flow and wet the fibers. Generally speaking, the temperatures should be at least about 50° above the minimum compression molding temperature of the polymer, and below the thermal decomposition temperature.

The conversion of tetraalkyl titanates, such as tetraisopropyl titanate, to TiO$_2$ occurs even at room temperature in moist air, and more readily at temperatures somewhat below those needed for producing adequate flow of most polymeric materials. For example, tetraisopropyl titanate is largely converted to TiO$_2$ by heating for 2 hours at 120° C.

Tetraisopropyl titanate is soluble in most solvents commonly used to dissolve polymers, and this is also true of other tetraalkyl titanates having from 1 to 8 carbon atoms in the alkyl groups. Accordingly, the selection of such a titanium ester does not seriously limit the selection of the solvent. Moreover, if a high-boiling solvent is required for solution of the resin in the coating mixture this is not too serious a matter, at least so far as baking temperature is concerned, since such solvents can be removed at temperatures not exceeding the baking temperature, at diminished pressure if desired.

The solvent should however be completely dry, so as to prevent premature hydrolysis of the titanium ester. Moreover, it is desirable to avoid solvents which undergo condensation reactions, with liberation of water, in the presence of titanium esters. Such a solvent is acetone.

TABLE II

*Properties of laminates of resin-impregnated glass fiber reinforced sheets. Comparison with similar laminates in which there is an intervening layer of resin-titanium compound between the surface of the glass and the external resin sheet*

| Polymer | Reinforcement | Resin loading, percent | Volume, percent glass | Volume, percent voids | Titanium compound in coating, initially | Resin in coating | Solvent in coating | Impregnation temperature, °C. |
|---|---|---|---|---|---|---|---|---|
| Polyethylene | Glass mat | | | | None | Polyethylene | Toluene | 160 |
| Do | Glass cloth | 40 | 32 | 8 | None | do | do | 300 |
| Do | do | 33 | 37 | 11 | TPT | do | do | 160 |
| Do | do | 35 | 37 | 6 | None | do | do | 160 |
| Do | do | 18 | 50 | 19 | TPT | do | do | 300 |
| Polystyrene | do | 52 | 26 | 27 | TPT | Polystyrene | do | 300 |
| Polymethyl methacrylate | do | 65 | 16.5 | 15 | None | None | None | 160 |
| Do | do | 42 | 30.5 | 21 | do | do | do | 300 |
| Do | do | 49 | 29 | 22 | TPT | Polymethylmethacrylate | m-Cresol | 300 |
| Hexamethylene polyadipamide | do | 25 | 47 | 18 | TPT | Hexamethylenepolyadipamide | do | 300 |
| Polyethylene terephthalate | do | 32 | 48 | 31 | None | None | None | 310 |
| Do | do | 30 | 49 | 26 | TPT | Polyethylene terephthalate | m-Cresol | 310 |
| Do | do | 47 | 37 | 2 | TPT | do | Nitrobenzene | 300 |
| Do | Glass mat | 25 | 51 | 19 | TPT | do | m-Cresol | 300 |
| Do | Glass cloth | 46 | 37 | Nil | TPT | do | s-Tetrachloroethane | 300 |

| Polymer | Flexural modulus | | Flexural strength, p.s.i. | Compressive strength, p.s.i. | Impact strength, IZOD, ft./lb./in. | After 2-hour boil | | After 3 days' soak in H₂O | | Creep rate at 100 hours, in./in./hr.×10⁷ |
|---|---|---|---|---|---|---|---|---|---|---|
| | 25° | Higher temperature (percent of 25° figure) | | | | Percent stiffness | Percent weight gain | Percent stiffness | Percent weight gain | |
| Polyethylene | 319,000 | | | | | | | | | |
| Do | 990,000 | | | | | 89 | 1 | 90 | 1 | |
| Do | 1,270,000 | | | | | 86 | 1 | 91 | 1 | |
| Do | 1,046,000 | | | | | 71 | 1 | 74 | 2 | |
| Do | 1,460,000 | 78%/70°C; 49%/100°C | | | | 86 | Nil | 86 | 1 | |
| Polystyrene | 2,830,000 | 53%/70°C; 39%/100°C | | 23,100 | 6.51 | 87 | Nil | 86 | Nil | 3.3/4,240 p.s.i.; 7.9/8,200 p.s.i. |
| Polymethyl methacrylate | 298,000 | | | | | 42 | 11 | 40 | 15 | |
| Do | 1,415,000 | | | | | 56 | 2 | 51 | 3 | |
| Do | 1,880,000 | | | | | 94 | 1 | 76 | 2 | |
| Hexamethylene polyadipamide | 1,600,000 | 107%/50°C; 99%/100°C; 94%/135°C; 89%/200°C | | | | 73 | 2.5 | 86 | 3.5 | |
| Polyethylene terephthalate | 2,200,000 | | | | | 80 | 1 | 66 | 1 | |
| Do | 2,550,000 | 105%/50°; 90%/100°; 81%/137°; 67%/200°C | | | | 98 | 1½ | 100 | 1½ | |
| Do | 1,650,000 | 97%/150°; 107%/100°; 101%/150°; 99%/200°C | | 4,800 | 8.99 | 96 | 1 | 102 | 2 | |
| Do | 1,330,000 | 90%/71°; 75%/100°; 68%/137°; 67%/200°C | | | 15.9 | 80 | 2 | 92 | 2 | |
| Do | 1,540,000 | 104%/50°; 95%/100°; 71%/150°; 79%/200°C.; 80%/250°C | 15,600 | 6,220 | 6.92 | 80 | 1 | 100 | 2 | |

Dimethylformamide, is somewhat disadvantageous for this same reason. Toluene and similar hydrocarbons or mixtures thereof, exemplify good solvents which can be used with polyethylene, polystyrene, and polymethyl methacrylate. Meta cresol can be used with most polymers, and to some extent it inter-acts with the titanium ester to release alkanol and leave m-cresol titanate or a mixed ester behind. This is not disadvantageous, and is indeed helpful in some instances where the interchange enhances compatibility of the resin with the titanium compounds. Phenolic compounds sometimes form colored esters by such interchange reactions (usually red or yellow). Where this is to be avoided, and where the toxicity of the phenol is an undesirable factor, such phenols should not be used. Good solvents when the polymer in the coating is a polymeric polyester, particularly polyethylene terephthalate, are o-dichlorobenzene, methyl salicylate, s-tetrachloroethane, and nitrobenzene. s-Tetrachloroethane has the advantage of dissolving the polyester at room temperature.

The glass fibers, used as reinforcement in the method of this invention, may be in any form, such as matted fibers, fabric, spun threads, etc. The term "glass" as employed herein means ordinary glass.

The composited articles, obtained by the process of this invention may be in the form of laminated sheets, molded objects, extruded products, etc. Where the term "polymer stratum" is used herein, there is no intention to limit the shape of the layer in any respect whatever, e. g. the resin is not necessarily in the form of a uniformly thick stratum or film of resin, but may constitute a continuous phase of any shape, within which the coating of polymer-titanium compound on the fibers is enveloped.

The products obtained by the method of this invention are useful in numerous practical applications such as in the manufacture of molded objects, heat-formable sheets, etc.

I claim:

1. The method of preparing a glass-fiber reinforced article which comprises coating glass fibers with a composition comprising a tetra-alkyl ester of titanic acid in which the alkyl groups contain from 1 to 8 carbon atoms, a normally solid thermoplastic linear synthetic resin, an inert organic solvent for said ester and synthetic resin, removing said solvent from said coating by evaporation, heating the resultant coated fibers at an elevated temperature, said temperature being below the thermal decomposition temperature of the synthetic resin, continuing the said heating until the tetra-alkyl titanate has decomposed to titanium dioxide, thereafter impregnating the resulting coated fibers with a molten synthetic resin, and cooling the resultant article to below the temperature at which the said synthetic resin is molten.

2. The method of claim 1 wherein the said synthetic resin in the coating on the said glass fiber surfaces is polyethylene.

3. The method of claim 1 wherein the said synthetic resin in the coating on the said glass fiber surfaces is polyethylene, and the said impregnating resin is also polyethylene.

4. The method of claim 1 wherein the said synthetic resin in the coating on the said glass fiber surfaces is polymethyl methacrylate.

5. The method of claim 1 wherein the said synthetic resin in the coating on the said glass fiber surfaces is polymethyl methacrylate, and the said impregnating resin is also polymethyl methacrylate.

6. The method of claim 1 wherein the said synthetic resin in the coating on the said glass fiber surfaces is polyethylene terephthalate.

7. The method of claim 1 wherein the said synthetic resin in the coating on the said glass fiber surfaces is polyethylene terephthalate, and the said impregnating resin is also polyethylene terephthalate.

8. The method of claim 1 wherein the said synthetic resin in the coating on the said glass fiber surfaces is polystyrene.

9. The method of claim 1 wherein the said synthetic resin in the coating on the said glass fiber surfaces is polystyrene, and the said impregnating resin is also polystyrene.

10. The method of claim 1 wherein the said ester is tetra isopropyl titanate.

References Cited in the file of this patent
UNITED STATES PATENTS

| | | |
|---|---|---|
| 2,512,058 | Gulledge | June 20, 1950 |
| 2,572,906 | Berringer | Oct. 30, 1951 |
| 2,577,936 | Waggoner | Dec. 11, 1951 |
| 2,643,262 | Bostwick | June 23, 1953 |
| 2,710,267 | Boyd et al. | June 7, 1955 |

OTHER REFERENCES

Kravitzer, Journal Oil Colour Chemical Association, vol. 31 (1948), pp. 406 to 408.